W. U. DENNISON.
GAGE GLASS GUARD.
APPLICATION FILED FEB. 25, 1915.
1,150,504.
Patented Aug. 17, 1915.
2 SHEETS—SHEET 1.
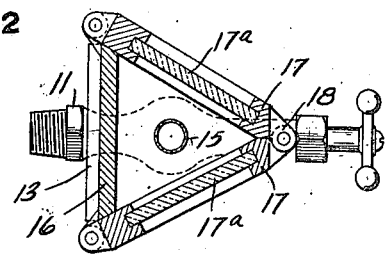
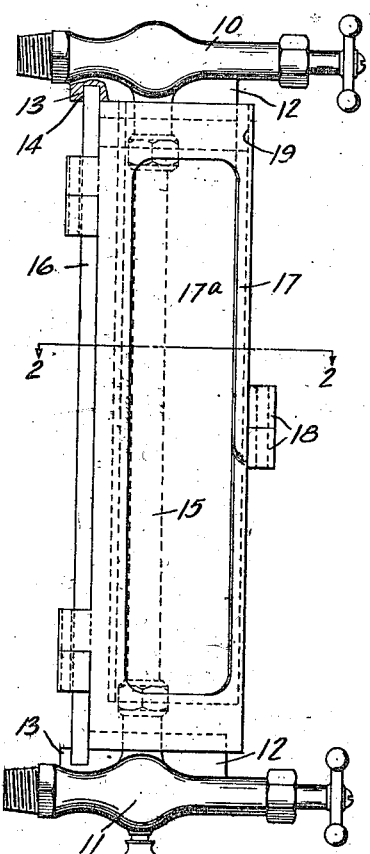
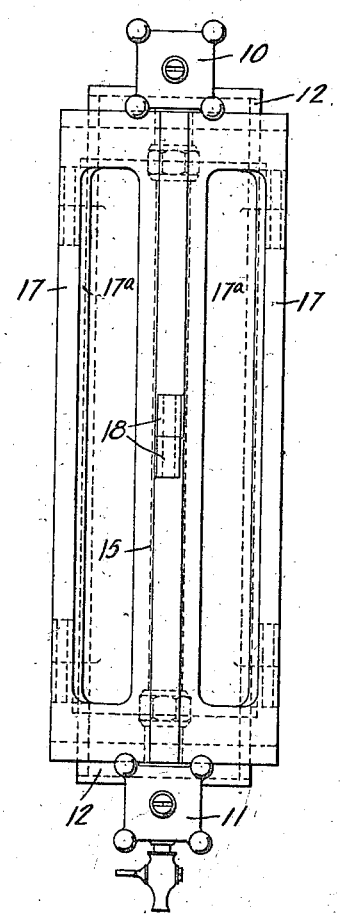
WITNESSES
INVENTOR

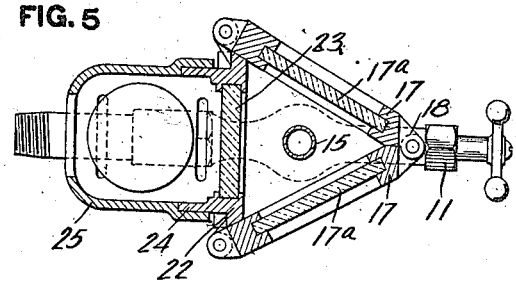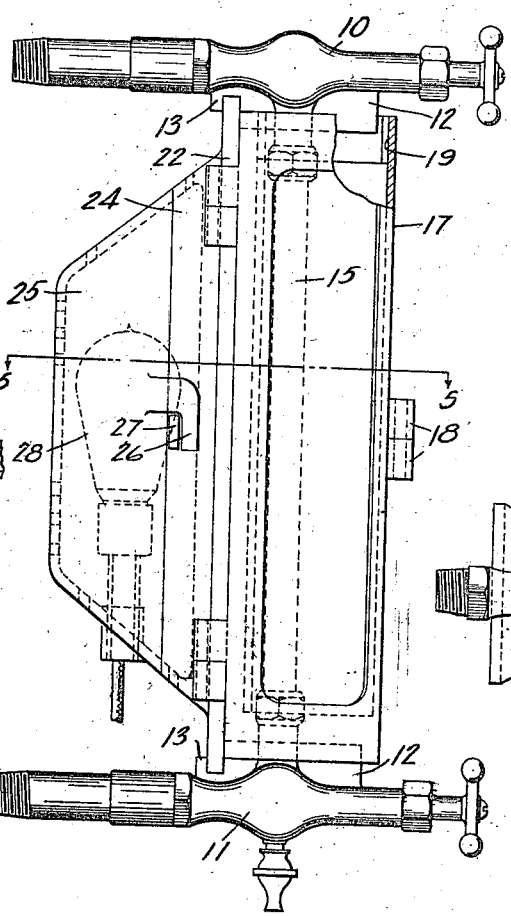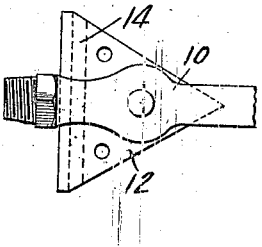

UNITED STATES PATENT OFFICE.

WILLIAM U. DENNISON, OF YOUNGSTOWN, OHIO.

GAGE-GLASS GUARD.

1,150,504.

Specification of Letters Patent.

Patented Aug. 17, 1915.

Application filed February 25, 1915. Serial No. 10,442.

*To all whom it may concern:*

Be it known that I, WILLIAM U. DENNISON, a citizen of the United States, and resident of Youngstown, in the county of Mahoning and State of Ohio, have invented certain new and useful Improvements in Gage-Glass Guards, of which the following is a specification.

My invention relates to gage glass guards and has particular reference to a novel hinged guard for use in connection therewith.

I am aware that it is not broadly new to provide a casing for a gage glass, one or more of the parts of which casing are hinged to permit access to the glass as required. Many of the disadvantages following the use of the devices heretofore suggested are sought to be overcome in the present structure.

One of the particular objects in the present device is to lessen the number of parts composing the shell; to provide a device which shall be self-supporting and one in which the glass is fully supported at all its edges; to provide a guard of this type which may be placed in position or removed without the use of a wrench, or other tools, and to so construct the device that when fitted into place it becomes practically a unit with the two fittings.

The invention will be more readily understood by reference to the accompanying drawings, wherein:

Figure 1 is a side elevation of my improved gage glass guard applied to the upper and lower gage cock fittings, Fig. 2 is a section on the line 2—2 of Fig. 1, Fig. 3 is a front elevation of the construction shown in Fig. 1, Fig. 4 is a side elevation of a slightly modified form of the device, Fig. 5 is a section on the line 5—5 of Fig. 4, Fig. 6 is a sectional detail of a fragment of the upper fitting, and Fig. 7 is a plan view of the same.

Referring more particularly to the drawings, it will be seen that I provide upper and lower gage cocks 10, 11, each thereof having a triangular projection 12 on the sides thereof. Adjacent to the rear edge of the triangular projection, I provide a flange 13, thereby forming a groove 14 which extends transversely across the projection. A gage glass 15 is mounted between the nipples of the two fittings.

My novel guard, as shown in Figs. 1 to 3 inclusive, may consist in a plate or rear wall 16, the upper and lower ends of which are accommodated within the groove 14 in the fittings. Hinged to this back plate are duplicate side plates 17, which plates in service are joined at their free edges by means of apertured ears 18, and the pin, not shown, which passes through the apertures. These side plates 17 are provided with wire glass windows, the glass 17ª being inserted through the hollow upper end 19 of the plates, the side and bottom edges of the glass being accommodated within grooves formed in the plate. It will be noted that the side plates embrace, at their top and bottom edges, the projections on the fittings, and that in consequence the gage glass is entirely inclosed within a strong casing. Nevertheless, the construction is such that the guard may be removed within a fraction of a minute and without the use of tools. The steps necessary to remove the device from between the fittings are the removal of the pin within the lugs 18, the swinging of the hinged sides into the plane of the back plate, and then sliding the back plate laterally out of the groove.

The detailed views shown in Figs. 6 and 7 illustrate the fittings which are adapted for use with either the constructions shown in Figs. 1 to 3, or that shown in Figs. 4 and 5.

In the construction shown in Figs. 4 and 5 I have modified the back plate to a certain extent, the side plates being duplicates of those shown in Figs. 1 to 3. In this construction the back plate 22 engages at its ends with the grooves in the fittings 10, 11, and has the side plates hinged thereto. However, the back plate, as best shown in Fig. 5, is cut out in its middle portion to accommodate the section of wire glass 23. This back plate is also provided with projecting marginal flanges 24, the outer edges of which form a seat for a lamp casing 25, the parts being held in proper position by the coöperating hook and lug 26, 27. If desired, the glass 23 may be ribbed in order to diffuse the light projected therethrough by the lamp 28. The construction shown is very simple, the side plates 17 being duplicates and so proportioned that they may be reversed, if desired, thus obviating the necessity for left and right hand portions. The construction is capable of considerable modification; and such modifications as are within the scope of my claims I consider within the spirit of my invention.

I claim:

1. In a gage glass guard, the combination of upper and lower valve fittings having integral projections having an outline shaped to correspond to the shape of the guard when applied thereto, a pair of metallic frames and a supporting plate, glass fitted in said frames, each of said frames being hinged to said plate, said plate and said frames fitting closely around the projections on the upper and lower fittings when the parts are in assembled relation, substantially as described.

2. In a device of the class described, the combination of upper and lower fittings, each thereof having a groove, a guard including a back plate formed to slidably engage said grooves, and side plates hinged to said back plate, substantially as described.

3. In a device of the class described, the combination of gage glass fittings, each thereof having a groove, and a gage glass guard including a back plate and two side plates hinged to said back plate, the top and bottom portions of said back plate slidably engaging the grooves in said fittings, substantially as described.

4. In a device of the class described, the combination of upper and lower fittings, each thereof being provided with an integral triangular projection, a back plate for a gage glass guard fitted between said fittings and lying against one edge of each of said projections, and side plates hinged to said back plate and lying against the other two edges of said projections, subtantially as described.

5. In a device of the class described, the combination of a back plate and two side plates hinged thereto, said back plate projecting at both ends beyond the plane of the ends of the side plates and providing means for coöperation with gage glass fittings, substantially as described.

6. In a device of the class described, the combination of a back plate and two side plates hinged thereto, the free edges of said hinged plates being adapted to be secured together to form a structure of triangular shape in cross section, the extremities of said back plate projecting beyond the extremities of said side plates to thereby provide means for engagement with gage glass fittings, substantially as described.

7. In a device of the class described, the combination of upper and lower gage glass fittings, said fittings being provided with oppositely disposed integral projections, a gage glass guard consisting of a plurality of plates, each of which is provided with a glass insert, said plates, when assembled, fitting closely the projections on said fittings, and a casing removably engaging one of said plates, said casing being adapted to accommodate a source of light, substantially as described.

8. In a device of the class described, the combination of upper and lower fittings, grooved projections oppositely disposed on each thereof, a gage glass guard including a back plate having a glass insert and provided with portions engaging the grooves in said fittings, a pair of side plates having glass inserts and said plates, when assembled, closely fitting the projections on said fittings, and a case removably engaging said back plate and adapted to accommodate a source of light, substantially as described.

Signed at Youngstown, Ohio, this 22nd day of February, 1915.

WILLIAM U. DENNISON.

Witnesses:
HERBERT G. R. BENNETT,
GLEN H. WEBER.